United States Patent
Li (10) Patent No.: US 10,277,052 B2
(45) Date of Patent: Apr. 30, 2019

(54) CONTROLLING POWER DELIVERY TO A BATTERY

(71) Applicant: O2Micro Inc., Santa Clara, CA (US)

(72) Inventor: Guoxing Li, Sunnyvale, CA (US)

(73) Assignee: O2Micro Inc., Santa Clara, CA (US)

( * ) Notice: Subject to any disclaimer, the term of this patent is extended or adjusted under 35 U.S.C. 154(b) by 0 days.

(21) Appl. No.: 15/823,011

(22) Filed: Nov. 27, 2017

(65) Prior Publication Data
US 2018/0212435 A1 Jul. 26, 2018

(30) Foreign Application Priority Data

Jan. 25, 2017 (GB) .................................. 1701271.7
Mar. 15, 2017 (CN) .......................... 2017 1 0154735

(51) Int. Cl.
*H02J 7/04* (2006.01)
*H02J 7/16* (2006.01)
*H02J 7/00* (2006.01)

(52) U.S. Cl.
CPC ............ *H02J 7/007* (2013.01); *H02J 7/0004* (2013.01); *H02J 7/0065* (2013.01); *H02J 2007/0062* (2013.01); *H02J 2007/0096* (2013.01); *Y02B 40/90* (2013.01)

(58) Field of Classification Search
CPC ........... Y02E 60/12; H02J 7/14; H02J 7/0068; H01M 10/441; H01M 10/44
USPC ....................................................... 320/162
See application file for complete search history.

(56) References Cited

U.S. PATENT DOCUMENTS

| | | | |
|---|---|---|---|
| 2003/0067283 A1* | 4/2003 | Takimoto | H02J 7/041 320/162 |
| 2012/0286741 A1 | 11/2012 | Seethaler et al. | |
| 2017/0279286 A1* | 9/2017 | Zhang | H02J 7/0045 |
| 2017/0339098 A1* | 11/2017 | Joseph | H04L 61/20 |
| 2017/0346304 A1* | 11/2017 | Hung | H02J 7/0068 |
| 2018/0006473 A1* | 1/2018 | Bessegato | H02J 7/0026 |

OTHER PUBLICATIONS

Combined Search and Examination Report issued in UK Application No. 1701271.7 (now UK Patent No. 2543225), dated Feb. 27, 2017, (6) pages.

* cited by examiner

*Primary Examiner* — Arun C Williams (57) ABSTRACT

A controller for controlling power delivery to a battery includes a first terminal that provides a first signal to enable a bypass path to deliver power from an interface to charge the battery, and includes a second terminal that provides a second signal to enable a conversion circuit to convert input power received at the interface to output power to charge the battery. The controller also includes circuitry that determines whether a first adapter or a second adapter is connected to the interface, generates the second signal if the second adapter is connected to the interface, generates the first signal and a request if the first adapter is connected to the interface, and provides the request to the first adapter through the interface. The request includes information indicative of a target level and an instruction that causes the first adapter to provide power at the target level to the interface.

24 Claims, 8 Drawing Sheets

CONTROLLING POWER DELIVERY TO A BATTERY

REFERENCE TO RELATED APPLICATIONS

This application claims benefit under 35 U.S.C. § 119(a) to Application No. GB1701271.7, filed with the United Kingdom Intellectual Property Office on Jan. 25, 2017, which was also filed as Application No. 201710154735.3 on Mar. 15, 2017, with the State Intellectual Property Office of the People's Republic of China, hereby incorporated herein by reference in their entirety.

BACKGROUND

Figure 1:
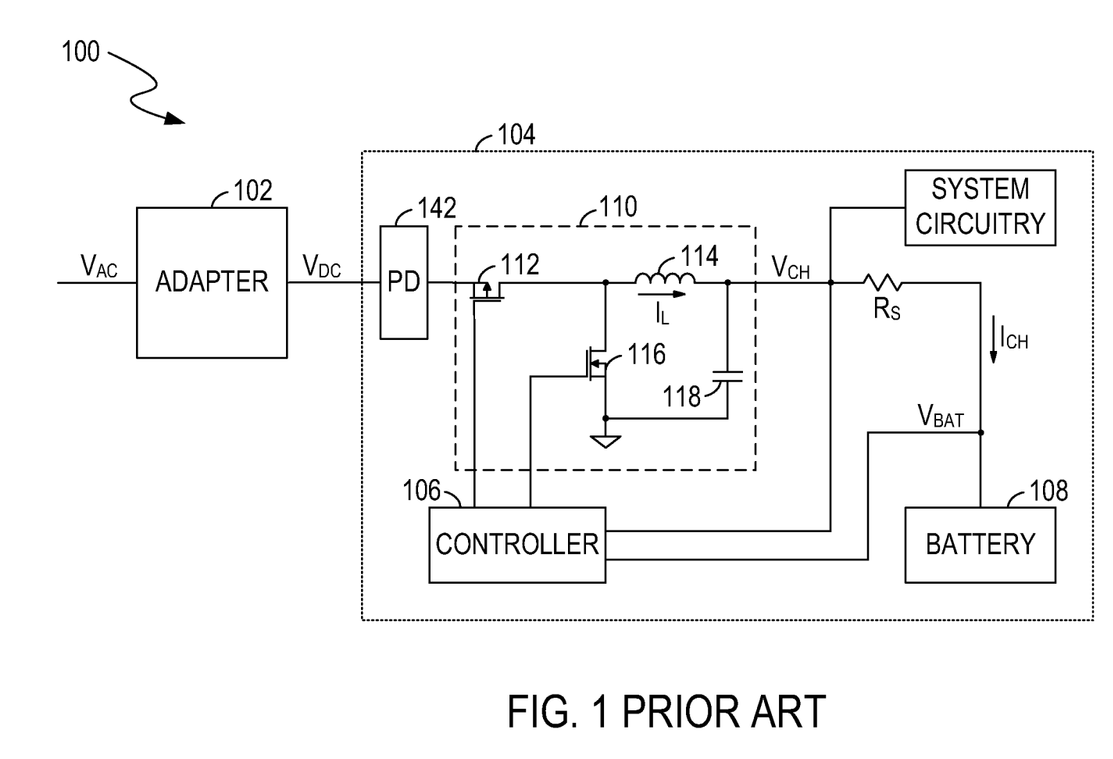
FIG. 1 illustrates a block diagram of a conventional power delivery system for a battery.

FIG. 1 illustrates a block diagram of a conventional power delivery system 100 for delivering power to a battery 108. As shown in FIG. 1, the power delivery system 100 includes an adapter 102 and a host device 104. The host device 104 includes a power-delivery (PD) interface 142, a power conversion circuit 110 (e.g., a switching charger), a controller 106, and system circuitry. The power conversion circuit 110 includes a switching circuit (e.g., including a high-side switch 112 and a low-side switch 116), an inductor 114, and a filter circuit such as a capacitor 118. In operation, the adapter 102 converts an alternating-current (AC) input voltage $V_{AC}$ to a direct-current (DC) output voltage $V_{DC}$, and provides the DC voltage $V_{DC}$ to the PD interface 142 of the host device 104. The PD interface 142 delivers the DC voltage $V_{DC}$ to the power conversion circuit 110. The controller 106 controls the power conversion circuit 110 to convert the DC voltage $V_{DC}$ to a charging voltage $V_{CH}$ to charge the battery 108 by alternately switching on the switches 112 and 116. For example, when the switch 112 is on and the switch 116 is off, the inductor 114 receives power $V_{DC}$ from the PD interface 142 and an inductor current $I_L$ flowing through the inductor 114 increases. When the switch 112 is off and the switch 116 is on, the inductor 114 releases power and the inductor current $I_L$ decreases. The inductor current $I_L$ ramps up and down when the controller 106 alternately turns on the switches 112 and 116. The capacitor 118 filters out an AC portion of the inductor current $I_L$ and provides a DC charging current $I_{CH}$ to charge the battery 108. The controller 106 can increase the charging current $I_{CH}$ or the charging voltage $V_{CH}$ by increasing the duty cycle of the switches 112 and 116, and decrease the charging current $I_{CH}$ or the charging voltage $V_{CH}$ by decreasing the duty cycle of the switches 112 and 116. As a result, the power delivery system 100 can adjust power delivered to charge the battery 108 at a specified level.

A conventional method to perform fast charge on the battery 108 includes controlling the power conversion circuit 110 to convert the DC voltage $V_{DC}$ to a relatively large charging current $I_{CH}$ to charge the battery 108. However, the power conversion circuit 110 consumes relatively high power when a large current flows through the elements (e.g., including the switch 112, the switch 116, and the inductor 114) in the power conversion circuit 110. It is because these elements include non-zero resistance when they are operating in a switching mode, e.g., in which the switches 112 and 116 are turned on and off alternately. Thus, a conversion efficiency of the power conversion circuit 110 is relatively low. Additionally, in the conventional power delivery system 100, the PD interface 142 has a current limit that defines a maximum level of an input current of the host device 104. In order to generate a relatively large charging current $I_{CH}$ to charge the battery 108, an adapter 102 with a relatively high output voltage $V_{DC}$ is used to provide power to the host device 104. Thus, the voltage across the power conversion circuit 110 is relatively high, which also causes high power consumption in the power conversion circuit 110. Moreover, the power consumption of the power conversion circuit 110 is converted into plenty of heat to increase the temperature of the power conversion circuit 110 and the battery 108, which deteriorates the battery 108 and reduces the lifetime of the battery 108. Furthermore, an inductor (or switch) capable of sustaining a large current and/or a high voltage usually has a large size and is expensive. Thus, the size of a printed circuit board (PCB) for a power conversion circuit 110 including such an inductor 114 and switches 112 and 116 can be relatively large, and the cost for it can also be relatively high. Solutions that address these shortcomings would be beneficial.

SUMMARY

In one embodiment, a controller for controlling power delivery to a battery includes a first terminal, a second terminal, and control circuitry coupled to the first and second terminals. The first terminal provides a first signal to enable a bypass path coupled between an interface and the battery such that the bypass path delivers power from the interface to charge the battery. The second terminal provides a second signal to enable a conversion circuit coupled between the interface and the battery such that the conversion circuit converts input power received at the interface to output power to charge the battery. The control circuitry determines whether a first adapter or a second adapter is connected to the interface, generates the second signal if the second adapter is connected to the interface, generates the first signal and a request if the first adapter is connected to the interface, and provides the request to the first adapter through the interface. The request includes information indicative of a target level and an instruction that causes the first adapter to provide power at the target level to the interface.

In another embodiment, a method for controlling power delivery to a battery includes: determining whether a first adapter or a second adapter is connected to an interface; enabling a conversion circuit coupled to the interface to convert power from the second adapter to output power to charge the battery if the second adapter is connected to the interface; enabling a bypass path coupled to the interface to deliver power from the first adapter to charge the battery if the first adapter is connected to the interface; and providing a request to the first adapter through the interface if the first adapter is connected to the interface. The request includes information indicative of a target level and an instruction that causes the first adapter to provide power at the target level to the interface.

In yet another embodiment, a system for delivering power to a battery includes an interface, a bypass path coupled to the interface, a conversion circuit coupled to the interface, and control circuitry coupled to the bypass path and the conversion circuit. The interface provides a request to a first adapter and receives power from the first adapter if the first adapter is connected to the interface, and receives power from a second adapter if the second adapter is connected to the interface. The request includes information indicative of a target level and an instruction that causes the first adapter to provide power at the target level to the interface. The bypass path delivers the power from the first adapter to charge the battery when the bypass path is enabled. The conversion circuit converts the power from the second adapter to output power to charge the battery when the conversion circuit is enabled. The control circuitry determines whether the first adapter or the second adapter is connected to the interface, enables the bypass path and generates the request if the first adapter is connected to the interface, and enables the conversion circuit if the second adapter is connected to the interface.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "identifying," "generating," "comparing," "determining," "setting," "estimating," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data and includes any information delivery media. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2A:
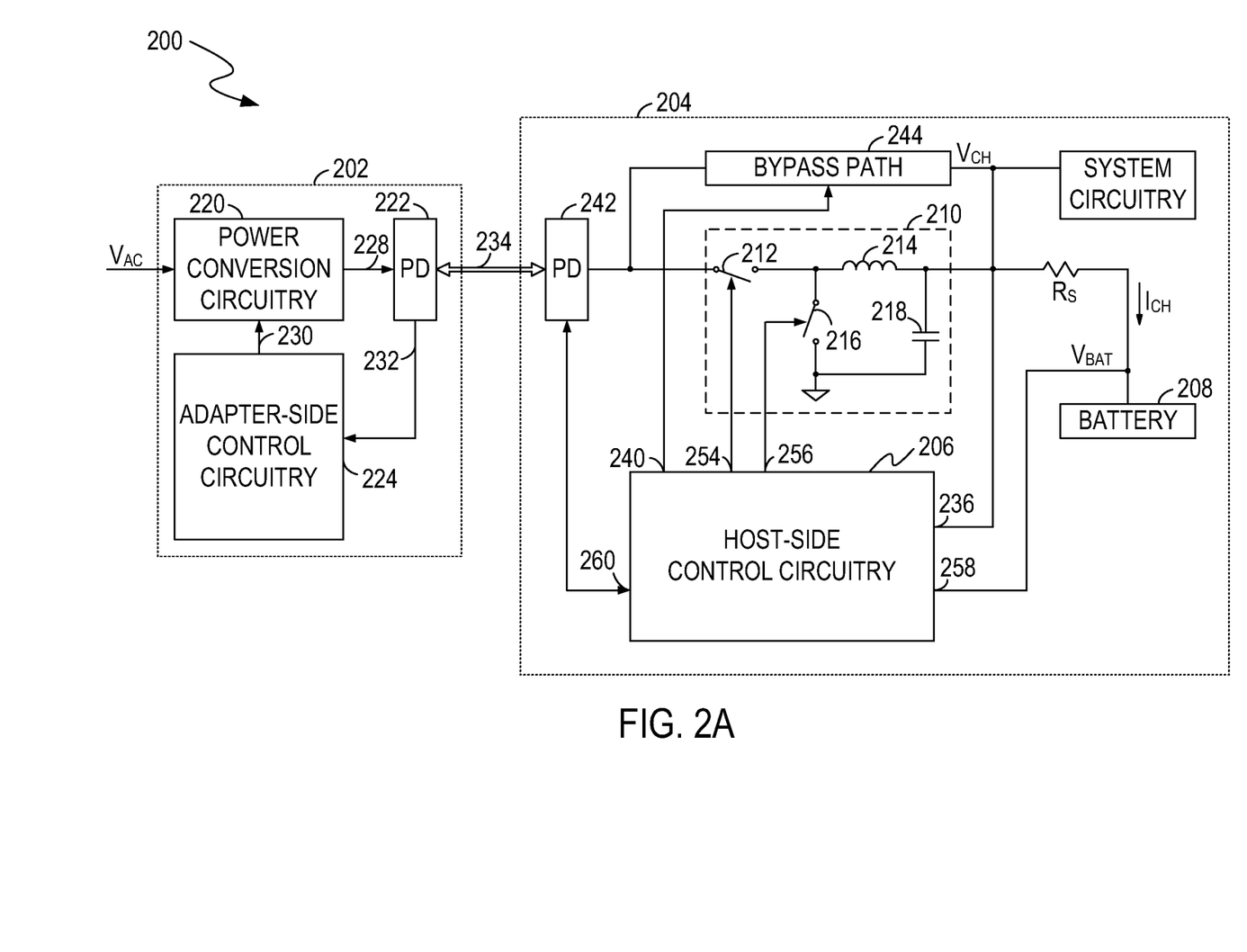
FIG. 2A illustrates a block diagram of an example of a power delivery system for a battery, in an embodiment according to the present invention.

FIG. 2A illustrates a block diagram of an example of a power delivery system 200 for a rechargeable battery 208, in an embodiment according to the present invention. The power delivery system 200 includes an adapter 202 and a host device 204. In one embodiment, the host device 204 can be a portable device such as a mobile phone, a laptop computer, a tablet computer, a palmtop computer, or the like. The host device 204 may also be a portable device such as a camera, an electric toothbrush, an electric shaver, a wireless earphone, or the like. In one embodiment, the host device 204 can be powered by the adapter 202 and/or the battery 208. The host device 204 can also cooperate with the adapter 202 to charge the battery 208. The battery 208 may be, but not limited to, lithium ion battery, lithium ion polymer battery, lead-acid battery, nickel cadmium battery, nickel metal hydride battery, or the like.

As shown in FIG. 2A, the adapter 202 includes power conversion circuitry 220, adapter-side control circuitry 224, and a power-delivery (PD) interface 222. The power conversion circuitry 220 can receive an alternating-current (AC) power, e.g., an AC voltage $V_{AC}$ such as 220 VAC, 110 VAC, or the like from an electric supply, and convert the AC power to a direct-current (DC) output power 228, e.g., including a DC voltage and/or a DC current. The adapter-side control circuitry 224 can include one or more control terminals coupled to the power conversion circuitry 220 and generate one or more control signals 230 at the control terminals to control the power conversion performed by the conversion circuitry 220. The adapter-side control circuitry 224 can control the power conversion circuitry 220 such that the output power 228 is regulated to a target level. In one embodiment, the adapter-side control circuitry 224 includes a processing unit capable of executing computer-readable instructions. The PD interface 222 can receive the output power 228 from the power conversion circuitry 220 and deliver the output power 228 to the host device 204 through a channel 234. The PD interface 222 can also receive a request, e.g., a data pack, from the host device 204 through the channel 234 and provide/forward the request 232 to the adapter-side control circuitry 224. The request 232 includes information indicative of the target level of the output power 228. The request 232 can also include an instruction or instructions, e.g., computer readable instructions, that cause the adapter-side control circuitry 224 to control the power conversion circuitry 220 such that the output power 228 is regulated to the target level and the adapter 202 provides power at the target level to the host device 204. In one embodiment, the PD interface 222 includes an interface capable of delivering power and receiving/transmitting data. For example, the PD interface 222 includes, but is not limited to, a universal serial bus (USB) interface, a dock connecter, or the like.

In one embodiment, the host device 204 can be compatible with at least a first type of adapter 202 (hereinafter, first adapter 202), and a second type of adapter (hereinafter, second adapter). The first adapter 202 can receive an abovementioned request from the host device 204 and regulate its output power 228, e.g., an output voltage or an output current, to a target level indicated by the information in the request. In other words, the first adapter 202 can have an adjustable output voltage and/or an adjustable output current, and the level of the output voltage/current is determined by the request. The second adapter (not shown in FIG. 2A) may have a simpler circuit structure and less functions compared with the first adapter 202. The second adapter can provide a fixed output voltage, and its output current is determined by the load of the host device 204. In one embodiment, a maximum output power of the second adapter is less than a maximum output power of the first adapter 202.

More specifically, in one embodiment, the host device 204 includes a PD interface 242, a bypass path 244 coupled between the PD interface 242 and the battery 208, a power conversion circuit 210 coupled between the PD interface 242 and the battery 208, and host-side control circuitry 206 coupled to the PD interface 242, the bypass path 244, the power conversion circuit 210, and the battery 208. The power conversion circuit 210 can include a switching circuit (e.g., including a high-side switch 212 and a low-side switch 216), an inductor 214, and a filter circuit such as a capacitor 218. Operation of the power conversion circuit 210 can be similar to that of the power conversion circuit 110 described in relation to FIG. 1. In one embodiment, the PD interface 242 includes an interface capable of delivering power and receiving/transmitting data. For example, the PD interface 242 includes, but is not limited to, a universal serial bus (USB) interface, a dock connecter, or the like.

In one embodiment, if the first adapter 202 is connected to the host device 204, e.g., the PD interface 222 is connected to the PD interface 242 via a cable or the PD interface 222 is plugged into a socket of the PD interface 242, then the host-side control circuitry 206 can generate an abovementioned request, and the PD interface 242 can provide the request to the first adapter 202. The PD interface 242 can receive power from the first adapter 202 and deliver the power to the bypass path 244. The host-side control circuitry 206 can enable the bypass path 244 to deliver the power from the first adapter 202 to charge the battery 208. Hence, the host device 204 can use the bypass path 244 to deliver power which has been regulated at a target level or a desired level from the first adapter 202 to the battery 208. In one embodiment, the host device 204 can perform fast charge on the battery, e.g., deliver a relatively large charging current from the first adapter 202 to charge the battery 208, without performing power conversion, e.g., performed by the conversion circuit 110 mentioned in relation to FIG. 1. Thus, compared with the host device 104 in FIG. 1, the host device 204 can consume less power and produce less heat when the battery 208 is charged by a relatively large charging current.

In one embodiment, if the second adapter is connected to the host device 204, then the PD interface 242 can receive power from the second adapter and deliver the power to the power conversion circuit 210. The host-side control circuitry 206 can enable the power conversion circuit 210 to convert input power received at the PD interface 242, e.g., power from the second adapter, to output power at a preset level to charge the battery 208. In one embodiment, a maximum level of output power, e.g., including an output voltage and an output current, of the second adapter can be relatively low compared with that of the first adapter 202. Thus, during the power conversion, a current flowing through the power conversion circuit 210 and/or a voltage across the power conversion circuit 210 can be relatively small, which reduces the power consumption of the power conversion circuit 210. Additionally, because elements capable of sustaining a large current and/or a high voltage can be omitted in the power conversion circuit 210, the size of the printed circuit board (PCB) for the power conversion circuit 210 and the cost of the power conversion circuit 210 can be reduced.

The host-side control circuitry 206 can include one or more communication terminals 260, a control terminal 240, control terminals 254 and 256, and monitoring terminals 236 and 258. The one or more communication terminals 260 can include a request providing terminal configured to provide an abovementioned request to the PD interface 242. The one or more communication terminals 260 can also include an identity receiving terminal configured to receive information indicative of an identity, e.g., the type, of an adapter connected to the PD interface 242. The request providing terminal and the identity receiving terminal may be the same terminal or different terminals. The control terminal 240 can be used to provide an enable signal to enable, e.g., turn on, the bypass path 244 or a disable signal to disable, e.g., turn off, the bypass path 244. The control terminals 254 and 256 can be used to provide enable signals to enable the power conversion circuit 210, e.g., by alternately turning on the switches 212 and 216, or disable signals to disable the power conversion circuit 210, e.g., by turning off the switches 212 and 216. The monitoring terminal 258 can be used to monitor/sense a battery voltage $V_{BAT}$ of the battery 208. The monitoring terminals 236 and 258 can be used to monitor/sense a voltage across the sense resistor $R_S$, thereby monitoring/sensing a charging current $I_{CH}$ of the battery 208.

The host-side control circuitry 206 can identify an adapter coupled to the PD interface 242, e.g., determine whether an abovementioned first adapter 202 or an abovementioned second adapter is connected to the PD interface 242, based on the identity information or type information received at the communication terminal 260. If the second adapter is connected to the PD interface 242, then the host-side control circuitry 206 can generate enable signals to enable the power conversion circuit 210. If the first adapter 202 is connected to the PD interface 242, then the host-side control circuitry 206 can generate an enable signal to enable the bypass path 244. The host-side control circuitry 206 can also generate an abovementioned request and send the request to the first adapter 202 via the PD interface 242.

Additionally, the host-side control circuitry 206 can monitor a status, e.g., including a charging current $I_{CH}$ and/or a battery voltage $V_{BAT}$, of the battery 208 and generate a request, e.g., set the content in the request, based on the status of the battery 208. In one embodiment, the request can include computer-readable instructions that cause the first adapter 202 to operate in a mode of a constant-current (CC) charging mode and a constant-voltage (CV) charging mode based on the status of the battery 208.

More specifically, in one embodiment, during a charging process of the battery 208, the battery voltage $V_{BAT}$ can increase gradually. When the battery voltage $V_{BAT}$ has increased to be close to a fully-charged voltage $V_{FULL}$ of the battery 208, the charging current $I_{CH}$ can decrease gradually. When the charging current $I_{CH}$ has decreased to a predetermined current level $I_{FULL}$, the battery 208 can be considered to be fully charged. In one embodiment, when the battery voltage $V_{BAT}$ is greater than a first voltage reference $V_1$ and less than a second voltage reference $V_2$ ($V_1 < V_2 < V_{FULL}$), the host-side control circuitry 206 can generate a request including an instruction that causes the first adapter 202 to operate in a CC charging mode. The request also includes information indicative of a target current level of the charging current $I_{CH}$. In the CC charging mode, the first adapter 202 can provide a constant charging current $I_{CH}$ at the target current level to charge the battery 208. The "constant charging current," as used herein, is not limited to be constant all the time. The "constant charging current" can include a charging current $I_{CH}$ maintained at a first current level $I_{CC1}$ during a first time interval, a charging current $I_{CH}$ maintained at a second current level $I_{CC2}$ during a second time interval, etc. For example, during the CC charging mode, the host-side control circuitry 206 may reduce the target current level of the charging current $I_{CH}$ from a first current level $I_{CC1}$ to a second current level $I_{CC2}$ ($I_{CC1} > I_{CC2} > I_{FULL}$), e.g., by providing a new request to the first adapter 202, when the battery voltage $V_{BAT}$ increases from a first voltage level $V_{CC1}$ to a second voltage level $V_{CC2}$ ($V_1 \leq V_{CC1} < V_{CC2} \leq V_2$).

When the battery voltage $V_{BAT}$ has increased to be close to the fully-charged voltage $V_{FULL}$ of the battery 208, e.g., the battery voltage $V_{BAT}$ is greater than the second voltage reference $V_2$, the host-side control circuitry 206 can generate a request including an instruction that causes the first adapter 202 to operate in a CV charging mode. The request also includes information indicative of a target voltage level $V_{CV}$ of a charging voltage $V_{CH}$ provided to the battery 208. In the CV charging mode, the first adapter 202 can provide a constant charging voltage $V_{CH}$ at the target voltage level $V_{CV}$ to charge the battery 208, and the charging current $I_{CH}$ can decrease gradually. The target voltage level $V_{CV}$ can be, but not limited to be, equal to the fully-charged voltage $V_{FULL}$ or close to be, e.g., slight greater than, the fully-charged voltage $V_{FULL}$.

When the battery 208 is fully charged, e.g., the charging current $I_{CH}$ has decreased to the predetermined current level $I_{FULL}$, the host-side control circuitry 206 can generate a request including an instruction that causes the first adapter 202 to terminal the charging process. For example, the first adapter 202 may stop providing power to the host device 204. For another example, the first adapter 202 may reduce its output power to a level determined by the system load of the host device 204, e.g., the amount of power needed to support the system circuitry in the host device 204 to operate. Additionally, in one embodiment, the host-side control circuitry 206 may control the bypass path 244 such that the battery 208 is disconnected from the PD interface 242 and the system circuitry in the host device 204 can still receive power from the first adapter 202. In another embodiment, the host-side control circuitry 206 may control the bypass path 244 such that the battery 208 and the system circuitry are disconnected from the PD interface 242.

In operation, in one embodiment, when an adapter is connected to the PD interface 242, the host-side control circuitry 206 can identify what type of the adapter is. If it is an abovementioned first adapter 202, then the host-side control circuitry 206 can generate a request to instruct the first adapter 202 to provide power at a target level, and enable the bypass path 244 to deliver the power to the battery 208. The host-side control circuitry 206 can send one or more requests to the first adapter 202 based on the status of the battery 208 such that the first adapter 202 can operate in a CC charging mode or a CV charging mode to charge the battery. During the CC charging mode, in one embodiment, the host-side control circuitry 206 can instruct the first adapter 202 to provide a relatively large charging current to perform fast charge on the battery 208. The relatively large charging current can flow through the bypass path 244 to the battery 208, and the power consumption caused by the charging current can be relatively low. If the adapter connected to the PD interface 242 is an abovementioned second adapter, then the host-side control circuitry 206 can enable the power conversion circuit 210 to convert input power from the second adapter (e.g., a fixed output voltage) to output power (e.g., a charging voltage) at a preset level to charge the battery 208. In one embodiment, because the maximum output power of the second adapter can be relatively low, the power consumption of the power conversion circuit 210 can be relatively low. Additionally, compared with the power conversion circuit 110 in FIG. 1, a size of a PCB for the power conversion circuit 210 can be smaller and the cost of the power conversion circuit 210 can be lower.

Figure 2B:
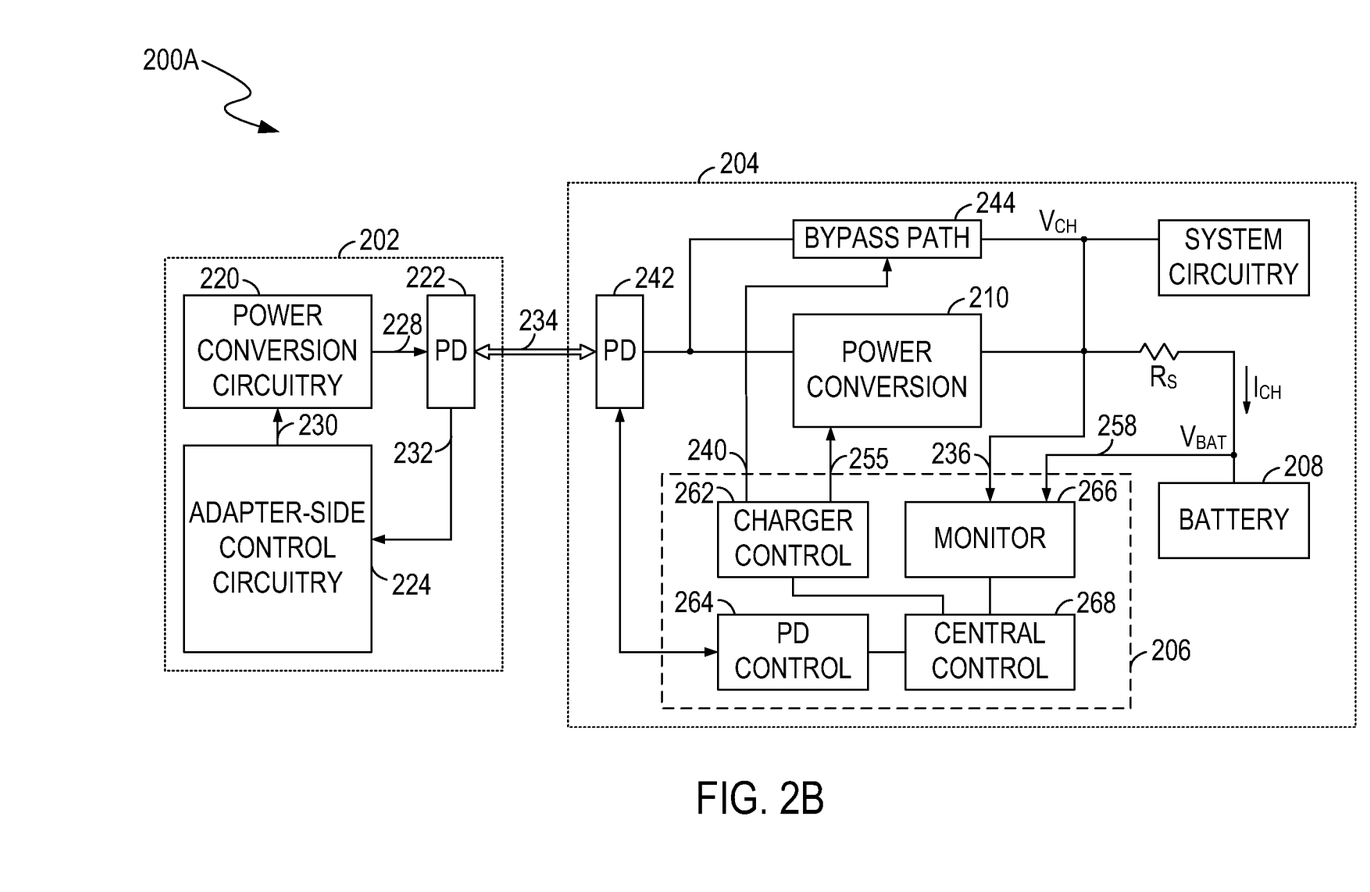
FIG. 2B illustrates a block diagram of an example of a power delivery system for a battery, in an embodiment according to the present invention.

FIG. 2B illustrates a block diagram of an example of a power delivery system 200A for a battery 208, in an embodiment according to the present invention. The power delivery system 200A can be an embodiment of the power delivery system 200 in FIG. 2A. In the example of FIG. 2B, the host-side control circuitry 206 includes a charger control circuit 262, a PD control circuit 264, a monitor circuit 266, and a central control circuit 268. The control circuits 262, 264, 266 and 268 can be included in one or more integrated circuits. For example, the control circuits 262, 264, 266 and 268 may be included in an integrated circuit controller (e.g., an IC chip). For another example, the control circuits 262 and 266 may be included an IC chip, and the control circuits 264 and 268 may be included in another IC chip. For yet another example, the control circuits 262, 264 and 266 may be included in an IC chip, and the central control circuit 268 may be include in another IC chip. For yet another example, the PD control circuit 264 may be included in an IC chip, and the control circuits 262, 266 and 268 may be included in one or more other IC chips.

In one embodiment, the PD control circuit 264 may receive identity/type information from the PD interface 242 to determine what type of an adapter connected to the PD interface 242 is, and generate an indication signal accordingly. The PD control circuit 264 may also provide the indication signal to the central control circuit 268. If an abovementioned first adapter 202 is connected to the PD interface 242, then the PD control circuit 264 may send an abovementioned request to the PD interface 242 and control the PD interface 242 to forward the request to the PD interface 222 of the first adapter 202, under the control of the central control circuit 268. The charger control circuit 262 may generate a control signal 240 to enable/disable the bypass path 244, and one or more control signals 255 to control the power conversion process of the power conversion circuit 210, under the control of the central control circuit 268. The monitor circuit 266 may monitor a status, e.g., including a charge current $I_{CH}$, a battery voltage $V_{BAT}$, etc., of the battery 208 and provide one or more signals indicative of the battery status to the central control circuit 268. The central control circuit 268 may control the charger control circuit 262 and the PD control circuit 264 according to the status of the battery 208 and the indication signal received from the PD control circuit 264. For example, if the indication signal indicates that an abovementioned second adapter is connected to the PD interface 242, then the central control circuit 268 can control the charger control circuit 262 to enable the power conversion circuit 210. If the indication signal indicates that an abovementioned first adapter 202 is connected to the PD interface 242, then the central control circuit 268 can control the charger control circuit 262 to enable the bypass path 244. The central control circuit 268 can also generate or control the PD control circuit 264 to generate a request that causes the first adapter 202 to provide output power at a target level corresponding to the status of the battery 208.

Figure 2C:
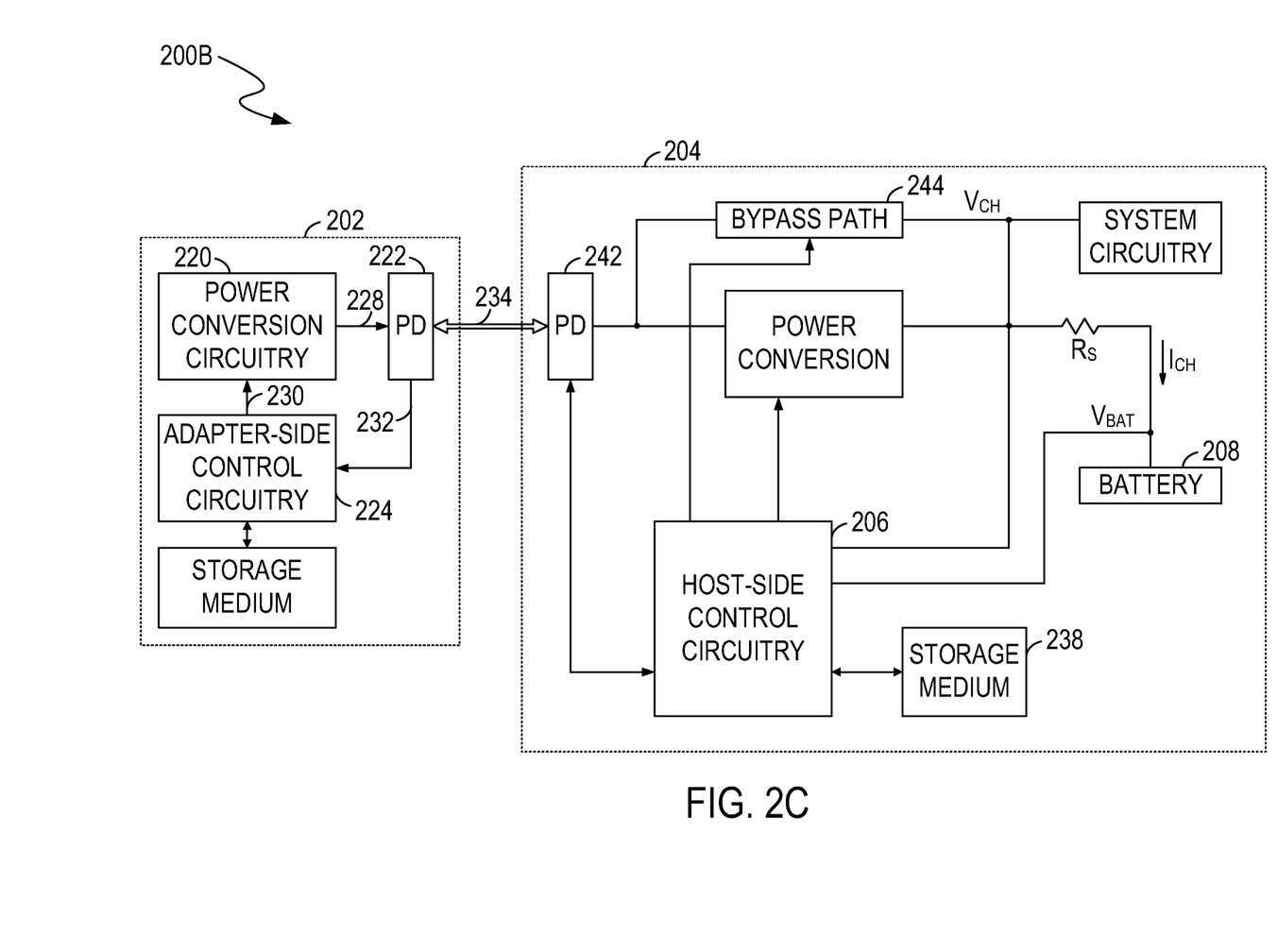
FIG. 2C illustrates a block diagram of an example of a power delivery system for a battery, in an embodiment according to the present invention.

FIG. 2C illustrates a block diagram of an example of a power delivery system 200B for a battery 208, in an embodiment according to the present invention. The power delivery system 200B can be an embodiment of the power delivery system 200 in FIG. 2A. In the example of FIG. 2C, the host device 204 also includes a non-transitory computer readable storage medium 238. The storage medium 238 may be included inside or placed outside of the host-side control circuitry 206. In one embodiment, the host-side control circuitry 206 includes a processing unit capable of executing computer-readable instructions. The storage medium 238 can include computer-readable instructions resided thereon. The computer-readable instructions, when executed by the host-side control circuitry 206, can cause the host-side control circuitry 206 to perform the abovementioned operations such as enabling the bypass path 244 or the power conversion circuit 210 based on the identity/type information of the adapter connected to the PD interface 242 and generating a request based on a status of the battery 208.

Figure 3:
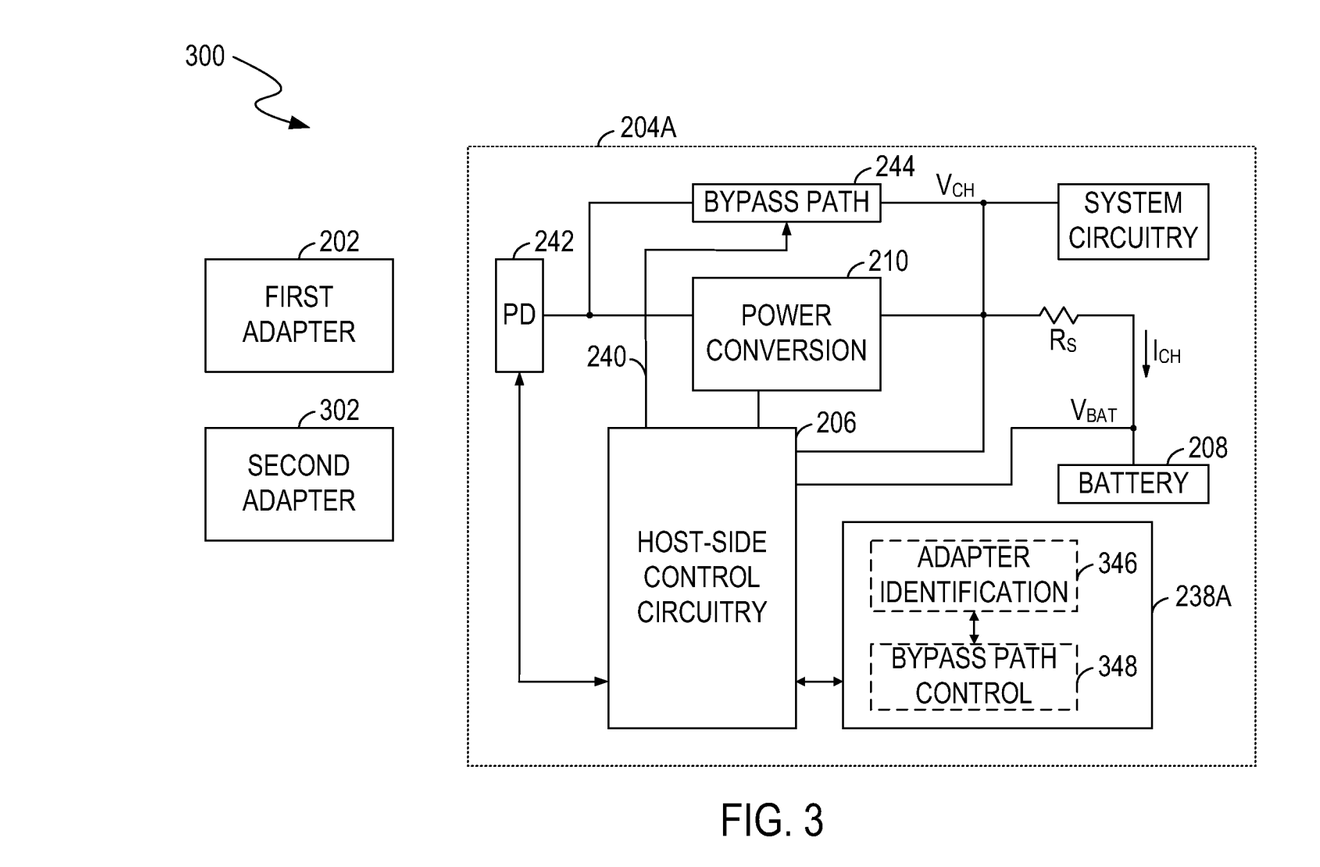
FIG. 3 illustrates a block diagram of an example of a power delivery system for a battery, in an embodiment according to the present invention.

FIG. 3 illustrates a block diagram of an example of a power delivery system 300 for a battery 208, in an embodiment according to the present invention. The storage medium 238A in FIG. 3 can be an embodiment of the storage medium 238 in FIG. 2C. As shown in FIG. 3, the storage medium 238A includes an adapter identification module 346, e.g., a program module including a set of computer-readable instructions, and a bypass path control module 348, e.g., a program module including a set of computer-readable instructions. In one embodiment, the adapter identification module 346, when executed by the host-side control circuitry 206, can cause the host-side control circuitry 206 to identify an adapter coupled to the PD interface 242, e.g., determine whether a first adapter 202 or a second adapter 302 is connected to the PD interface 242. The bypass path control module 348, when executed by the host-side control circuitry 206, can cause the host-side control circuitry 206 to enable the bypass path 244 or the power conversion circuit 210 based on the identity/type of the adapter connected to the PD interface 242.

Figure 4:
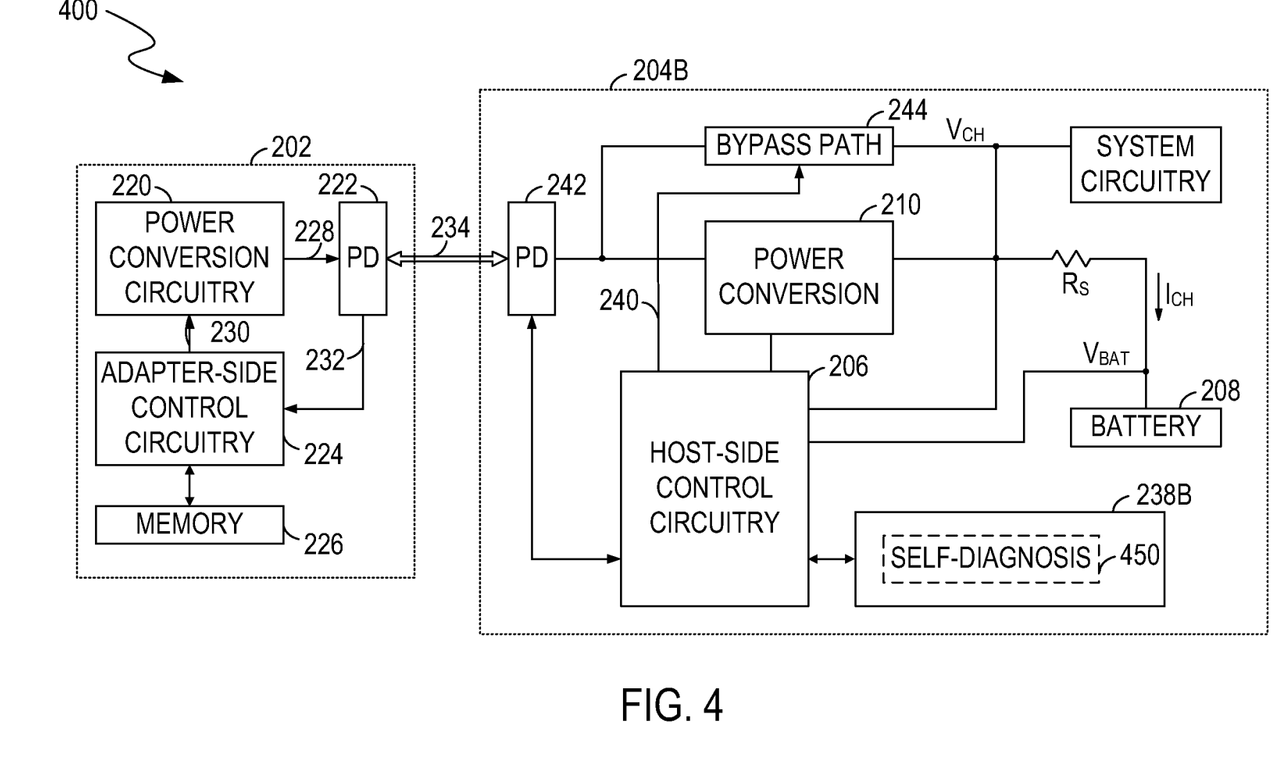
FIG. 4 illustrates a block diagram of an example of a power delivery system for a battery, in an embodiment according to the present invention.

FIG. 4 illustrates a block diagram of an example of a power delivery system 400 for a battery 208, in an embodiment according to the present invention. The storage medium 238B in FIG. 4 can be an embodiment of the storage medium 238 in FIG. 2C. As shown in FIG. 4, the storage medium 238B includes a self-diagnosis module 450, e.g., a program module including a set of computer-readable instructions. In one embodiment, the self-diagnosis module 450, when executed by the host-side control circuitry 206, can cause the host-side control circuitry 206 to perform self-diagnosis to check whether an abnormal condition is presented.

More specifically, in one embodiment, after sending an abovementioned request to the first adapter 202, the host-side control circuitry 206 can execute the self-diagnosis module 450 to check whether the first adapter 202 operates in a manner as requested by the host-side control circuitry 206. For example, the host-side control circuitry 206 can send a request, including a target level of output power of the first adapter 202, to the first adapter 202. The host-side control circuitry 206 can compare the power received from the first adapter 202 with the target level in the request to determine whether an abnormal condition occurs. If a difference between the power received from the first adapter 202 and the target level is greater than a predetermined reference, then the host-side control circuitry 206 can determine that an abnormal condition occurs.

By way of example, the host-side control circuitry 206 requests that the first adapter 202 provide an output current at a current level $I_{AD}$, and the current, e.g., a charging current $I_{CH}$, detected by the host-side control circuitry 206 has a current level $I_{HOST}$. If the current level $I_{HOST}$ is much less than the current level $I_{AD}$, e.g., a difference between the current levels $I_{AD}$ and $I_{HOST}$ is greater than a predetermined current reference, then the host-side control circuitry 206 can determine that there may be a leakage of current in somewhere between the first adapter 202 and the battery 208. Leakage of a charging current in the host device 204B may cause damage in the host device 204B. Thus, the host-side control circuitry 206 can terminate the charging process and instruct the first adapter 202 to stop providing power, in response to a detection of the abnormal condition.

By way of another example, the host-side control circuitry 206 requests that the first adapter 202 provide an output voltage at a voltage level $V_{AD}$, and the voltage, e.g., the battery voltage $V_{BAT}$ or the charging voltage $V_{CH}$, detected by the host-side control circuitry 206 has a voltage level $V_{HOST}$. If the voltage level $V_{HOST}$ is much less than the voltage level $V_{AD}$, e.g., a voltage difference between the voltage level $V_{AD}$ and the voltage level $V_{HOST}$ is greater than a predetermined voltage reference, then the host-side control circuitry 206 can determine that the connection between the PD interface 222 and the PD interface 242 may have a problem, e.g., they may have a loose connection with each other or a contact resistance between the PD interfaces 222 and 242 may increase abnormally. A large current flowing through such PD interfaces 222 and 242 may cause high power consumption, which may produce plenty of heat to damage the PD interfaces 222 and 242. Thus, the host-side control circuitry 206 can terminate the charging process and instruct the first adapter 202 to stop providing power, in response to a detection of the abnormal condition.

Figure 5:
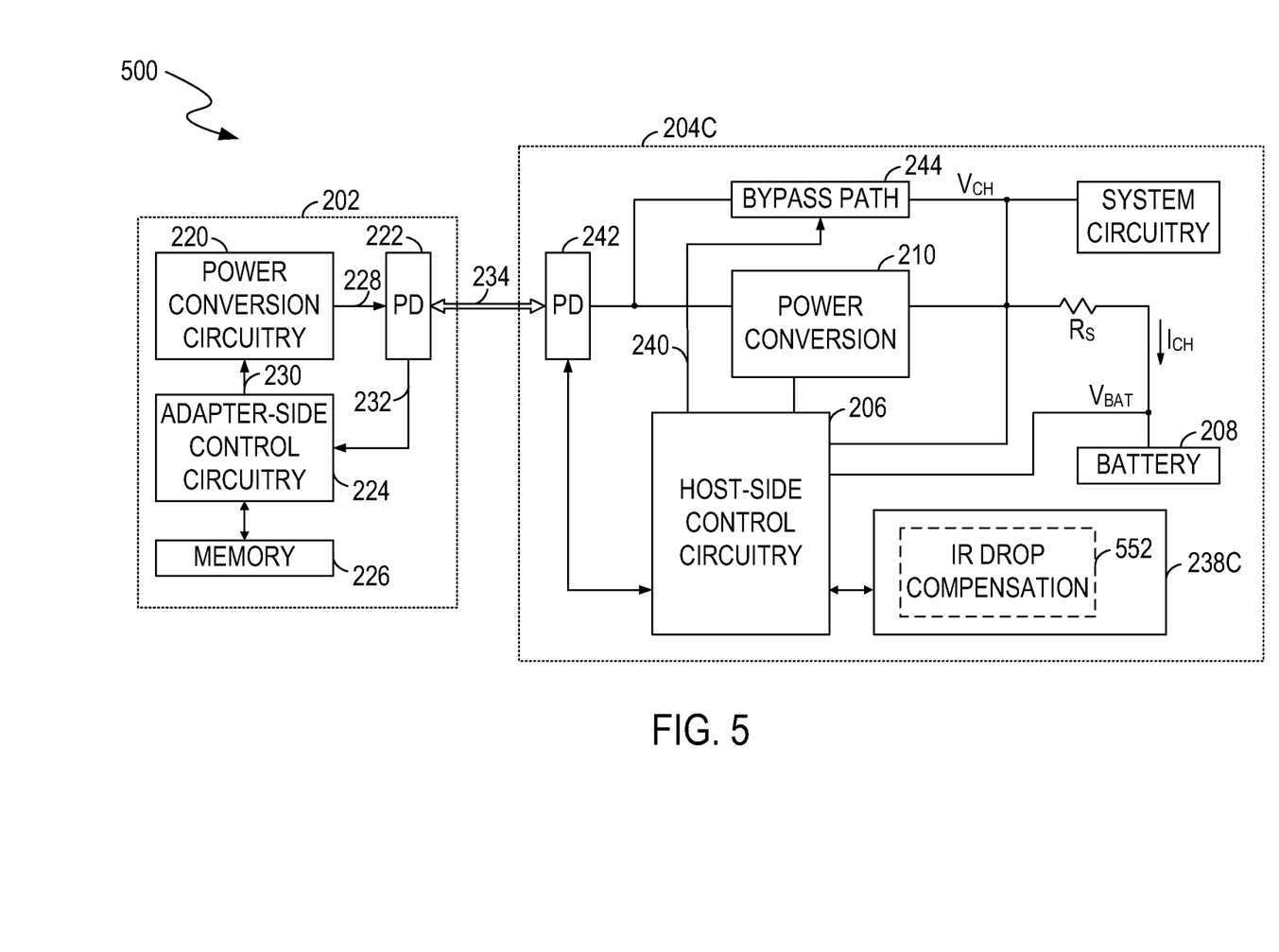
FIG. 5 illustrates a block diagram of an example of a power delivery system for a battery, in an embodiment according to the present invention.

FIG. 5 illustrates a block diagram of an example of a power delivery system 500 for a battery 208, in an embodiment according to the present invention. The storage medium 238C in FIG. 5 can be an embodiment of the storage medium 238 in FIG. 2C. As shown in FIG. 5, the storage medium 238C includes an internal-resistance (IR) drop compensation module 552, e.g., a program module including a set of computer-readable instructions. In one embodiment, the IR drop compensation module 552, when executed by the host-side control circuitry 206, can cause the host-side control circuitry 206 to estimate a voltage drop $V_{DR}$ of internal-resistance $R_{IN}$ between the PD interface 242 and the battery 208, and compensate the voltage drop $V_{DR}$ by setting a target level of output power from the first adapter 202 based on the estimated voltage drop $V_{DR}$. In one embodiment, the internal-resistance $R_{IN}$ may include resistance in the battery 208, resistance of elements (e.g., a charging switch, a sense resistor, e.g.,) in the bypass path 244, resistance of a PCB trace, etc.

In one embodiment, the host-side control circuitry 206 can provide a first request and a second request to the first adapter 202, compare a first status of the battery 208 caused by the first request and a second status of the battery 208 caused by the second request, and estimate a voltage drop $V_{DR}$ of internal-resistance $R_{IN}$ between the PD interface 242 and the battery 208. For example, the first request can include an instruction that causes the first adapter 202 to output a current at a first current level $I_{CH1}$, and the second request can include an instruction that causes the first adapter 202 to output a current at a second current level $I_{CH2}$. When the host device 204C receives a charging current at the first current level $I_{CH1}$, a voltage at the PD interface 242 is at a first voltage level $V_{PD1}$ which can be detected or monitored by the host-side control circuitry 206. When the host device 204C receives a charging current at the second current level $I_{CH2}$, a voltage at the PD interface 242 is at a second voltage level $V_{PD2}$ which can also be detected or monitored by the host-side control circuitry 206. In one embodiment, a time span $\Delta T$ between the time when the first request is generated and the time when the second request is generated is relatively short, and the current levels $I_{CH1}$ and $I_{CH2}$ are also relatively low. Thus, the actual battery voltage $V_{BAT}$ of the battery 208 can be considered not changed in the time span $\Delta T$. Accordingly, the following equations can be obtained:

$$I_{CH1}=(V_{PD1}-V_{BAT})/R_{IN}, \text{ and} \quad (1)$$

$$I_{CH2}=(V_{PD2}-V_{BAT})/R_{IN}. \quad (2)$$

Based on equations (1) and (2), the internal-resistance $R_{IN}$ can be given by:

$$R_{IN}=(V_{PD1}-V_{PD2})/(I_{CH1}-I_{CH1}) \quad (3)$$

As a result, the internal-resistance $R_{IN}$ between the PD interface 242 and the battery 208 can be estimated. A voltage drop $V_{DR}$ of the internal-resistance $R_{IN}$ can be given by: $V_{DR}=I_{CH}*R_{IN}$, where $I_{CH}$ represents a present charging current.

In one embodiment, the host-side control circuitry 206 sets a target level in a request, to be sent to the first adapter 202, based on a status of the battery 208 and the voltage drop $V_{DR}$. For example, the host-side control circuitry 206 can sent a request to instruct the first adapter 202 to operate in a CV mode when the battery 208 is closed to be fully charged. The host-side control circuitry 206 can also monitor a present charging current $I_{CH}$ of the battery 208 and estimate the voltage drop $V_{DR}$ by the equation: $V_{DR}=I_{CH}*R_{IN}$. The host-side control circuitry 206 can set a target level $V_{PD}$ of the output voltage of the first adapter 202 to be equal to a target level $V_{TARGET}$ of the battery voltage $V_{BAT}$ plus the voltage drop $V_{DR}$, e.g., $V_{PD}=V_{TARGET}+V_{DR}$. As a result, the battery voltage $V_{BAT}$ can be controlled more accurately and the charging cycle of charging the battery 208 can be reduced.

Figure 6:
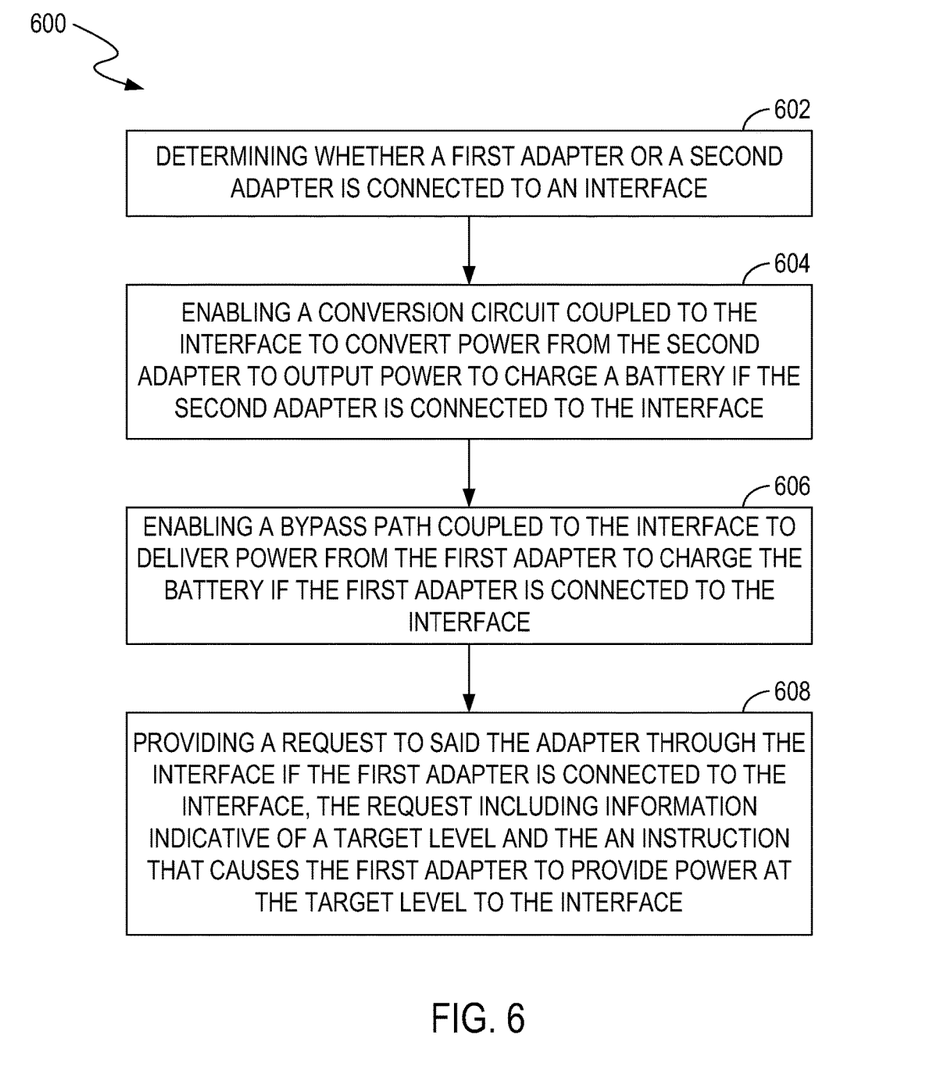
FIG. 6 illustrates a flowchart of an example of a method for controlling power delivery to a battery, in an embodiment according to the present invention.

FIG. 6 illustrates a flowchart of an example of a method for controlling power delivery to a battery, in an embodiment according to the present invention. FIG. 6 is described in combination with FIG. 2A, FIG. 2B, FIG. 2C, FIG. 3, FIG. 4 and FIG. 5.

In block 602, the host-side control circuitry 206 determines whether a first adapter 202 or a second adapter 302 is connected to the PD interface 242.

In block 604, the host-side control circuitry 206 enables the power conversion circuit 210 to convert power from the second adapter 302 to output power to charge the battery 208 if the second adapter 302 is connected to the PD interface 242.

In block 606, the host-side control circuitry 206 enables the bypass path 244 to deliver power from the first adapter 202 to charge the battery 208 if the first adapter 202 is connected to the PD interface 242.

In block 608, the host-side control circuitry 206 provides a request to the first adapter 202 through the PD interface 242 if the first adapter 202 is connected to the PD interface 242. The request includes information indicative of a target level. The request also includes an instruction that causes the first adapter 202 to provide power at the target level to the PD interface 242.

In summary, embodiments according to the present invention pertain to a power delivery system for delivering power to charge a battery. The power delivery system includes a host device compatible with at least a first adapter (e.g., an advanced adapter) and a second adapter (e.g., a general adapter). The first adapter can be used to provide a relatively large charging current to perform fast charge on the battery. When the first adapter is connected to the host device, the host device can send a request to instruct the first adapter to provide power at a target level, and can enable a bypass path to deliver the power from the first adapter to the battery, which can reduce power consumption in the host device. The second adapter may be used as a backup adapter. If the second adapter is connected to the host device, then the host device can enable a power conversion circuit to convert power from the second adapter to output power at a desired level to charge the battery. In one embodiment, the power conversion circuit receives relatively low power from the second adapter. Thus, power consumption of the power conversion circuit may be relatively low. Also, compared with the power conversion circuit in the conventional host device, the power conversion in the host device according to an embodiment of the present invention can have a smaller PCB size and cost less. Additionally, the host device can cooperate with the first adapter to perform self-diagnosis to check if an abnormal condition is presented, and protect the host device and the battery if an abnormal condition is detected. The host device can also cooperate with the first adapter to compensate an internal-resistance (IR) voltage drop thereby controlling the battery voltage of the battery more accurately and reducing the charging cycle of charging the battery.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A method for controlling power delivery to a battery, said method comprising:
   determining whether a first adapter or a second adapter is connected to an interface, wherein a maximum output power of said second adapter is less than a maximum output power of said first adapter;
   enabling a conversion circuit, coupled between said interface and said battery, to convert input power from said second adapter to output power to charge said battery if said second adapter is connected to said interface;
   enabling a bypass path, coupled between said interface and said battery, to deliver power from said first adapter to charge said battery if said first adapter is connected to said interface; and
   providing a request to said first adapter through said interface if said first adapter is connected to said interface, wherein said request comprises information indicative of a target level of an output power of said first adapter and further comprises an instruction that, when executed by said first adapter, causes said first adapter to provide output power at said target level to said interface.

2. The method of claim 1, wherein said request further comprises information indicative of a target current level of an output current of said first adapter, and wherein said method further comprises:
   comparing said output current from said first adapter, received via said interface, with said target current level of said output current; and
   determining that an abnormal condition is present if a difference between said output current from said first adapter and said target level of said output current is greater than a predetermined current reference.

3. The method claim 1, wherein said request further comprises information indicative of a target voltage level of an output voltage of said first adapter, and wherein said method further comprises:
   comparing said output voltage from said first adapter, received via said interface, with said target voltage level of said output voltage; and
   determining that an abnormal condition is present if a difference between said output voltage received from said first adapter and said target voltage level of said output voltage is greater than a predetermined voltage reference.

4. The method of claim 1, further comprising:
   generating a first request that causes said first adapter to output a first current at a first current level to said interface;
   detecting a first voltage at said interface when said interface receives said first current;
   generating a second request that causes said first adapter to output a second current at a second current level to said interface;
   detecting a second voltage at said interface when said interface receives said second current; and
   estimating a voltage drop of resistance between said interface and said battery according to a difference between said first and second current levels and a difference between said first and second voltage levels.

5. A system for delivering power to a battery, said system comprising:
   a bypass path, coupled between an interface and said battery, configured to deliver power from a first adapter to charge said battery when said first adapter is connected to said interface and said bypass path is enabled;
   a conversion circuit, coupled between said interface and said battery, configured to convert input power from a second adapter to output power to charge said battery when said second adapter is connected to said interface and said conversion circuit is enabled, wherein a maximum output power of said second adapter is less than a maximum output power of said first adapter; and
   control circuitry, coupled to said bypass path and said conversion circuit, configured to determine whether said first adapter or said second adapter is connected to said interface, configured to enable said conversion circuit if said second adapter is connected to said interface, and configured to enable said bypass path and generate a request if said first adapter is connected to said interface, wherein said request comprises information indicative of a target level of output power of said first adapter and further comprises an instruction that, when executed by said first adapter, causes said first adapter to provide output power at said target level to said interface.

6. The system of claim 5, wherein in a constant-current charging mode, said request generated by said control circuitry further comprises information indicative of a target current level of an output current of said first adapter.

7. The system of claim 5, wherein in a constant-voltage charging mode, said request generated by said control circuitry further comprises information indicative of a target voltage level of an output voltage of said first adapter.

8. The system of claim 5, wherein said control circuitry compares power received from said first adapter with said target level of said output power of said first adapter, and wherein if a difference between said power received from said first adapter and said target level of said output power is greater than a predetermined reference, then said control circuitry determines that an abnormal condition is present.

9. The system of claim 5, wherein said control circuitry provides a first request to said first adapter and detects a first voltage at said interface, provides a second request to said first adapter, and detects a second voltage at said interface, wherein said first request comprises an instruction that causes said first adapter to output a current at a first current level to said interface, and said second request comprises an instruction that causes said second adapter to output a current at a second current level to said interface, and wherein said control circuitry estimates a voltage drop of resistance between said interface and said battery according to a difference between said first and second current levels and a difference between said first and second voltage levels.

10. The system of claim 9, wherein said control circuitry sets a target voltage level of an output voltage of said first adapter according to a target level of a battery voltage of said battery plus said voltage drop, and according to a charging current of said battery.

11. The system of claim 5, wherein said request further comprises information indicative of a target current level of an output current of said first adapter, wherein said control circuitry compares said output current from said first adapter, received via said interface, with said target current level of said output current, and wherein if a difference between said output current from said first adapter and said target level of said output current is greater than a predetermined current reference, then said control circuitry determines that an abnormal condition is present.

12. The system of claim 11, wherein said abnormal condition comprises a leakage of current between said first adapter and said battery.

13. The system of claim 5, wherein said request further comprises information indicative of a target voltage level of an output voltage of said first adapter, wherein said control circuitry compares said output voltage from said first adapter, received via said interface, with said target voltage level of said output voltage, and wherein if a difference between said output voltage from said first adapter and said target voltage level of said output voltage is greater than a predetermined voltage reference, then said control circuitry determines that an abnormal condition is present.

14. The system of claim 13, wherein said abnormal condition comprises a loose connection between said first adapter and said interface.

15. A host device compatible with a first adapter and a second adapter, wherein a maximum output power of said second adapter is less than a maximum output power of said first adapter, and wherein said host device comprises:
an interface connectable to an adapter of said first adapter and said second adapter;
a bypass path, coupled between said interface and a battery, configured to deliver power from said first adapter to charge said battery if said first adapter is connected to said interface;
a conversion circuit, coupled between said interface and said battery, configured to convert input power from said second adapter to output power to charge said battery if said second adapter is connected to said interface; and
control circuitry, coupled to said bypass path and said conversion circuit, configured to determine which one of said first adapter and said second adapter is connected to said interface, configured to enable said conversion circuit if said second adapter is connected to said interface, and configured to enable said bypass path and generate a request if said first adapter is connected to said interface, wherein said request comprises information indicative of a target level of output power of said first adapter and further comprises an instruction that, when executed by said first adapter, causes said first adapter to provide output power at said target level to said interface.

16. The host device of claim 15, wherein in a constant-current charging mode, said request generated by said control circuitry further comprises information indicative of a target current level of an output current of said first adapter.

17. The host device of claim 15, wherein in a constant-voltage charging mode, said request generated by said control circuitry further comprises information indicative of a target voltage level of an output voltage of said first adapter.

18. The host device of claim 15, wherein said control circuitry compares power received by said host device from said first adapter with said target level of said output power of said first adapter, and wherein if a difference between said power received from said first adapter and said target level of said output power is greater than a predetermined reference, then said control circuitry determines that an abnormal condition is present.

19. The host device of claim 15, wherein said request comprises information indicative of a target current level of an output current of said first adapter, wherein said control circuitry compares said output current from said first adapter, received via said interface, with said target current level of said output current, and wherein if a difference between said output current from said first adapter and said target level of said output current is greater than a predetermined current reference, then said control circuitry determines that an abnormal condition is present.

20. The host device of claim 19, wherein said abnormal condition comprises a leakage of current between said first adapter and said battery.

21. The host device of claim 15, wherein said request further comprises information indicative of a target voltage level of an output voltage of said first adapter, wherein said control circuitry compares said output voltage from said first adapter, received via said interface, with said target voltage level of said output voltage, and wherein if a difference between said output voltage from said first adapter and said target voltage level of said output voltage is greater than a predetermined voltage reference, then said control circuitry determines that an abnormal condition is present.

22. The host device of claim 21, wherein said abnormal condition comprises a loose connection between said first adapter and said host device.

23. The host device of claim 15, wherein said control circuitry provides a first request to said first adapter and detects a first voltage at said interface, and provides a second request to said first adapter and detects a second voltage at said interface, wherein said first request comprises an instruction that causes said first adapter to output a current at a first current level to said interface, and said second request comprises an instruction that causes said second adapter to output a current at a second current level to said interface, and wherein said control circuitry estimates a voltage drop of resistance between said interface and said battery according to a difference between said first and second current levels and a difference between said first and second voltage levels.

24. The host device of claim 23, wherein said control circuitry sets a target voltage level of an output voltage of said first adapter according to a target level of a battery voltage of said battery plus said voltage drop, and according to a charging current of said battery.

* * * * *